April 1, 1952 — E. H. KRAMER — 2,591,558

FISHING LINE FLOAT

Filed March 12, 1947

Earnest H. Kramer
Inventor

By Philip A. H. Perrell
Attorney

Patented Apr. 1, 1952

2,591,558

UNITED STATES PATENT OFFICE 2,591,558

FISHING LINE FLOAT

Earnest H. Kramer, Tulsa, Okla.

Application March 12, 1947, Serial No. 734,276

1 Claim. (Cl. 43—44.9)

The invention relates to fishing line floats, and has for its object to provide a device of this kind so shaped and constructed to present the minimum amount of resistance to wind and provided with fins for engaging with the water, thereby limiting the drifting action of the float to a minimum.

A further object is to form the float from a chambered body member having radial outwardly and downwardly extending fins, and a closure member for the chamber, having radial fins registering with radial fins of the body member, and means whereby a fishing line may pass vertically through the float and be attached.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
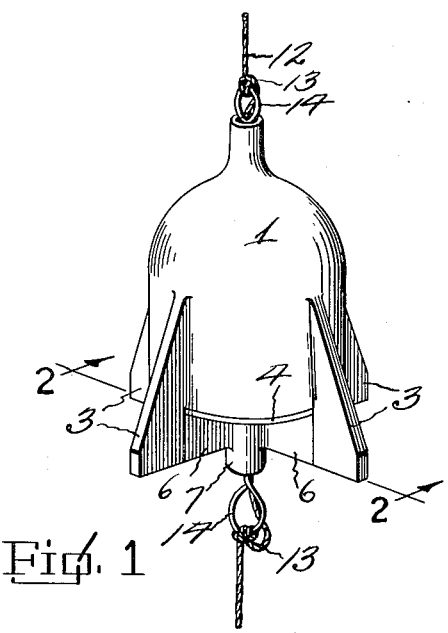
Figure 1 is a perspective view of the float.
Figure 2:
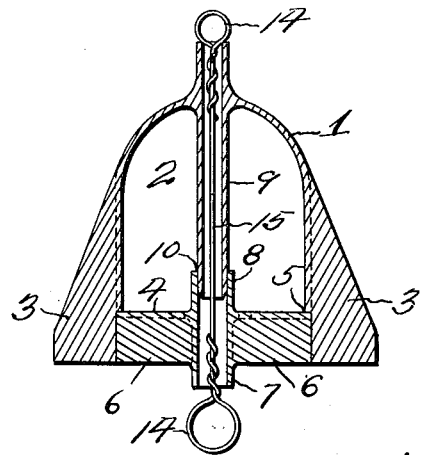
Figure 2 is a vertical transverse sectional view through the float, taken on line 2—2 of Figure 1.

Referring to the drawing, the numeral 1 designates the dome shaped body of the float and 2 an air chamber therein. Extending radially from the lower portion of the body 1 are water resisting fins 3, which present resisting planes to the water, thereby reducing the drift of the float to a minimum, particularly when the wind hits the float, consequently the number of times the float has to be repositioned, during a fishing operation is reduced to a minimum.

The lower end of the chamber 2, of the body member, is closed by a round disc 4, which may be cemented in position at 5. Disc 4 is provided with depending fins 6, which fins are in radial alinement with the fins 3, and extend outwardly from the downwardly extending tubular portion 7 of the disc. It will be noted that the upper side of the disc 4 is provided with a tubular extension 8 which telescopically engages over the depending tube 9 carried by the body member 1, and these parts may be connected together at 10 by a waterproof adhesive.

Figure 3:
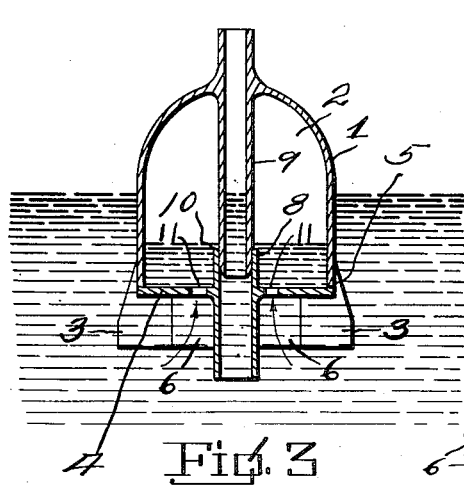
Figure 3 is a vertical transverse sectional view through the float at 45 degrees to that shown in Figure 2.

Disc 4 is provided with water ports 11, through which water passes as shown in Figure 3 and compresses the air in the chamber 2, therefore it will be seen that the trapped air will cause the float to rapidly rise to the surface after it has been submerged and released by the fish. Under these conditions, the bait will rapidly move in the water, thereby additionally attracting the fish.

The fishing line 12 passes through the tubular members 7, 8 and 9, and attached, adjustably, at 13 to the upper and lower eyes 14 of the wire 15, however it is to be understood that applicant does not limit himself to this particular line connection.

Figure 4:
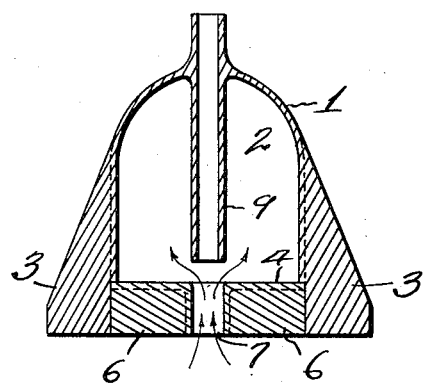
Figure 4 is a vertical transverse sectional view through a modified form of float.
Figure 5:
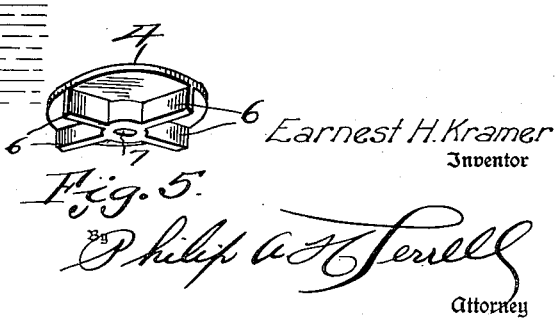
Figure 5 is a bottom perspective view of the lower closure member for the float shown in Figure 4.

Referring to Figures 5 and 4, the disc 4 is not connected to the tubular member 9 by a tubular member 8, consequently the water enters through the tubular member 7 into the chamber 2, and after the lower end of the tubular member 9 is sealed by the water the air in the chamber 2 is compressed.

From the above it will be seen that a fishing float is provided which will be subjected to a minimum amount of wind draft when in the water, and one wherein the float will rapidly rise to the surface after it has once been submerged.

The invention having been set forth what is claimed as new and useful is:

A surface fishing line float comprising a chambered body member having its lower end open and its upper end closed and dome shaped, radial vertical fins carried by said body member and terminating below the lower end of the body member, the inner edges of diametrically opposite fins below the body member being spaced apart a distance greater than the diameter of the chamber of the body member, a closure disc for the lower end of the body member, said closure disc engaging the lower edge of the body member, and having an axially disposed tubular member through which line engaging means pass, said tubular member and closure disc having vertical radial fins in the plane of and engaging the inner edges of the fins of the body member below the body member, the lower edges of the fins of the body member and the tubular member being in a plane transverse the tubular member, said tubular member extending upwardly into the chamber of the body member above the closure and an axially disposed tubular member carried by the body member and extending downwardly into the closure tubular member and anchored thereto.

EARNEST H. KRAMER.

REFERENCES CITED

The following references are of record in the file of this patent:

UNITED STATES PATENTS

| Number | Name | Date |
|---|---|---|
| 849,367 | Burke | Apr. 9, 1907 |
| 1,669,055 | Hogg | May 8, 1928 |
| 2,065,854 | Edel | Dec. 29, 1936 |
| 2,153,869 | Jones | Apr. 11, 1939 |
| 2,292,743 | Cordry | Aug. 11, 1942 |